United States Patent
Petrovic

(10) Patent No.: US 8,306,163 B1
(45) Date of Patent: Nov. 6, 2012

(54) METHOD AND APPARATUS FOR AUTOMATIC GAIN CONTROL

(75) Inventor: Vladan Petrovic, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 789 days.

(21) Appl. No.: 12/330,216

(22) Filed: Dec. 8, 2008

Related U.S. Application Data

(60) Provisional application No. 61/013,415, filed on Dec. 13, 2007.

(51) Int. Cl.
  *H03D 1/04* (2006.01)
  *H04B 1/06* (2006.01)
(52) U.S. Cl. ...................... 375/346; 455/232.1
(58) Field of Classification Search .................. 375/316, 375/345; 455/130, 132, 133, 136, 230, 232.1, 455/234.1, 239.1, 241.1, 245.1, 245.2, 251.1; 330/250, 278
See application file for complete search history.

(56) References Cited

U.S. PATENT DOCUMENTS

| | | | | |
|---|---|---|---|---|
| 6,073,848 A | * | 6/2000 | Giebel | 235/462.26 |
| 6,369,739 B1 | * | 4/2002 | Inada et al. | 341/155 |
| 6,498,926 B1 | * | 12/2002 | Ciccarelli et al. | 455/240.1 |
| 6,498,927 B2 | * | 12/2002 | Kang et al. | 455/245.2 |
| 7,616,052 B1 | * | 11/2009 | Ju et al. | 327/552 |
| 7,786,918 B2 | * | 8/2010 | Fukuzawa et al. | 341/155 |
| 2005/0276359 A1 | * | 12/2005 | Xiong | 375/345 |
| 2008/0002792 A1 | * | 1/2008 | Shalev | 375/345 |

* cited by examiner

*Primary Examiner* — David C. Payne
*Assistant Examiner* — Vineeta Panwalkar

(57) ABSTRACT

Aspects of the disclosure provide a receiver that can include a robust automatic gain control (AGC) mechanism. The receiver can include at least a first processing stage and a second processing stage. Each of at least the first processing stage and the second processing stage can include a controllable parameter. Further, the receiver can include a detector module. The detector module can switchably detect an output parameter of each of at least the first processing stage and the second processing stage. In addition, the receiver can include a controller module. The controller module can be configured to control the controllable parameters of at least the first processing stage and the second processing stage based on the detected output parameters of at least the first processing stage and the second processing stage.

22 Claims, 4 Drawing Sheets

METHOD AND APPARATUS FOR AUTOMATIC GAIN CONTROL

INCORPORATION BY REFERENCE

This application claims the benefit of U.S. Provisional Application No. 61/013,415, "AUTOMATIC GAIN CONTROL USING ANALOG SWITCHES AND DIGITAL POWER MEASUREMENT" filed on Dec. 13, 2007, which is incorporated herein by reference in its entirety.

BACKGROUND

A receiver can receive a signal that may be transmitted under various variable conditions, such as a variable environment condition, a variable interference condition, variable fading and distance conditions, and the like. Thus, the received signal may have variable signal properties, such as a variable signal amplitude, a variable power level, variable out-band blockers, and the like. The receiver may include a receiver front end that can process the received signal to achieve desired properties, such as a desired power level, a desired signal amplitude, and the like. The desired properties can enable subsequent processing components of the receiver to properly process the received signal. For example, the receiver may utilize an automatic gain control mechanism to achieve a signal power target, and thus utilize a full dynamic range of a subsequent analog-to-digital converter (ADC). The automatic gain control mechanism may distribute the gains among a plurality of processing stages of the receiver front end.

SUMMARY

Aspects of the disclosure can provide a receiver that can include a robust automatic gain control (AGC) mechanism. The receiver can include at least a first processing stage and a second processing stage. Each of at least the first processing stage and the second processing stage can include a controllable parameter. Further, the receiver can include a detector module. The detector module can switchably detect an output parameter of each of at least the first processing stage and the second processing stage. In addition, the receiver can include a controller module. The controller module can be configured to control the controllable parameters of at least the first processing stage and the second processing stage based on the detected output parameters of at least the first processing stage and the second processing stage.

In addition, the receiver can include an analog-to-digital converter (ADC) unit coupled to the detector. The ADC unit can switchably convert an output signal of each of at least the first processing stage and the second processing stage to a digital signal for the detector module to detect the output parameter. Therefore, the detector module can be configured to use the digital signal to detect the output parameters for the at least first processing stage and second processing stage. In an example, the detector module can include a digital power measurement unit.

According to an aspect of the disclosure, the receiver may also include at least a switch configured to couple at least the first processing stage and the second processing stage to the detector module. In an example, the switch can be an analog switch.

Additionally, according to the disclosure, at least the first processing stage and the second processing stage can include a variable gain amplifier having a controllable gain, respectively.

In an example, the first processing stage and the second processing stage can be coupled sequentially to process a signal. Therefore, the detector module may be switchably coupled to at least the first processing stage and the second processing stage following a pre-determined sequence.

According to an aspect of the disclosure, the receiver can be operative in an orthogonal frequency division multiplexing (OFDM) system. Further, the OFDM system can be a mobile wireless system or a fixed OFDM wireless system. Thus, the detector module and the controller module can be operative during a cyclic prefix of an OFDM symbol in a steady state operation. Alternatively, the detector module and the controller module can be operative when a signal power change is larger than a threshold before the steady state operation.

Aspects of the disclosure can also provide a method for automatic gain control. The method can include detecting an output parameter of a first processing stage having a controllable parameter using a detector, adjusting the controllable parameter of the first processing stage based on the detected output parameter of the first processing stage, switching a second processing stage having a controllable parameter to the detector, detecting an output parameter of the second processing stage using the detector, and adjusting the controllable parameter of the second processing stage based on the detected output parameter of the second processing stage.

To detect the output parameter of the first processing stage, the method can further include converting an output signal of the first processing stage to a digital signal and detecting the output parameter based on the digital signal. Further, to detect the output parameter based on the digital signal, the method can include measuring a digital power level based on the digital signal.

To switch the second processing stage, the method can include controlling a switch to couple the second processing stage to the detector. In an example, the switch can be an analog switch.

According to an aspect of the disclosure, the controllable parameter of the first processing stage can include a controllable gain of a variable gain amplifier.

To switch the second processing stage, the method can include switching the second processing stage to the detector according to a pre-determined sequence.

In an embodiment, the method can further include receiving information of a cyclic prefix duration of an OFDM symbol in a steady state operation. Alternatively, the method can include detecting a signal power change larger than a threshold during receipt of start frames of a network entry.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
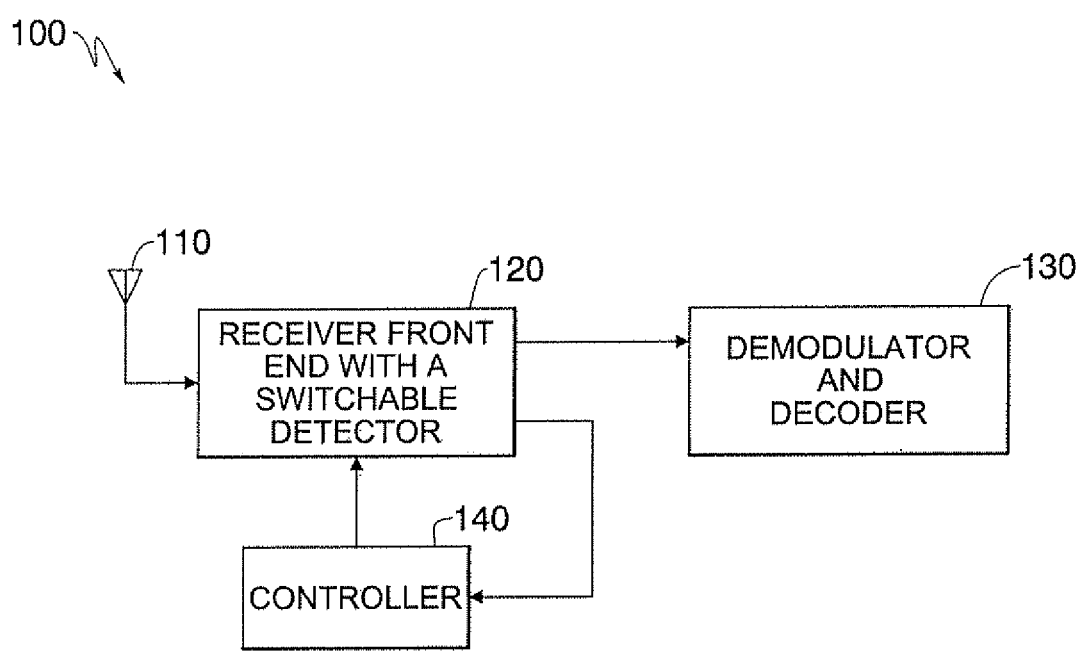
FIG. 1 shows a block diagram of an exemplary receiver.

FIG. 1 shows a block diagram of a receiver example according to the disclosure. The receiver 100 can include an antenna module 110, a receiver front end module 120, a demodulator and decoder module 130, and a controller module 140. These elements can be coupled together as shown in FIG. 1.

The antenna module 110 may receive various signals in the air, such as radio frequency signals transmitted from a base station, interference signals, noises, and the like, and convert the various signals into electrical signals. The radio frequency signals may carry various information, such as control information, reference information, user data, and the like. The radio frequency signals may be transmitted under various variable conditions, such as a variable geographic condition, a variable climate condition, a variable interference condition, and the like. Therefore, the converted electrical signals may have variable properties, such as variable power level, variable frequency spectrum, and the like.

The receiver front end module 120 can receive the electrical signals and process the electrical signals in order to shape the electrical signals to desired properties for subsequent receiver components to process. For example, the receiver front end module 120 may include a plurality of processing stages coupled with an analog-to-digital converter (ADC) unit. The ADC unit can obtain digital samples from the electrical signals. Further, the digital samples can be processed by digital processing techniques. The ADC unit may operate in a full dynamic range to achieve a preferred accuracy. Therefore, the plurality of processing stages may be configured to process the electrical signals to achieve a signal power target that can suit the full dynamic range of the ADC unit.

Generally, the plurality of processing stages may include controllable parameters, such as controllable gains. A controllable gain for a processing stage can be set in a limited range in order to avoid transistor saturation in the processing stage. The transistor saturation can be undesirable due to the reason that it can introduce amplifier nonlinearities. Therefore, the total desired gain may be distributed among the controllable gains of the plurality of processing stages to avoid the transistor saturation and minimize the amplifier nonlinearities at each of the plurality of processing stages.

In addition, the receiver front end module 120 may include a switchable detecting mechanism. The switchable detecting mechanism can be coupled with a first processing stage of the plurality of processing stages, and detect a parameter of the first processing stage. Then, the switchable detecting mechanism can be coupled with a second processing stage of the plurality of processing stages, and detect a parameter of the second processing stage. The detected parameters can be provided to the controller module 140.

The controller module 140 can receive the detected parameters for the plurality of processing stages of the receiver front end module 120. Further, the controller module 140 can adjust the controllable parameters, such as the controllable gains, of the plurality of processing stages based on the detected parameters. In an example, the controller module 140 may also provide a control signal to the switchable detecting mechanism to switch the switchable detecting mechanism accordingly.

The demodulator and decoder module 130 may receive a digital data stream from the receiver front end module 120. The digital data stream may be processed by various digital processing techniques, such as demodulation, decoding, and the like, to obtain the information transmitted from the base station.

It is noted that the receiver 100 can be used in a wireless communication system, such as an OFDM/OFDMA wireless communication system, to receive an OFDM radio frequency signal. The OFDM/OFDMA wireless communication system can be configured according to WiMax (IEEE 802.16), WiFi (IEEE802.11), LTE, and the like. In addition, the receiver 100 can be included in a user equipment, either a mobile or a fixed wireless user equipment. The user equipment may also include a transmitter that can transmit a radio frequency signal.

During operation, for example, the receiver 100 may determine a time to start an automatic gain control (AGC) process. In an example, the receiver 100 may start the AGC process during a time duration receiving a cyclic prefix (CP) of an OFDM symbol in a steady state operation. In another example, the receiver 100 may start the AGC process when a signal power change is larger than a threshold, such as at first few frames of a network entry. The AGC process may control the switchable detecting mechanism to be coupled with a first processing stage of the receiver front end module 120. The switchable detecting mechanism can detect a parameter of the first processing stage, such as a power level, and provide the parameter to the controller module 140. The controller module 140 may adjust a controllable parameter, such as a controllable gain, of the first processing stage, according to the detected parameter. Subsequently, the switchable detecting mechanism can be coupled with a second processing stage, for example under control of the controller module 140. The switchable detecting mechanism may detect a parameter of the second processing stage, and provide the detected parameter to the controller module 140. The controller module 140 may adjust, for example, a controllable gain of the second processing stage based on the detected parameter of the second processing stage, and so on and so forth.

Figure 2:
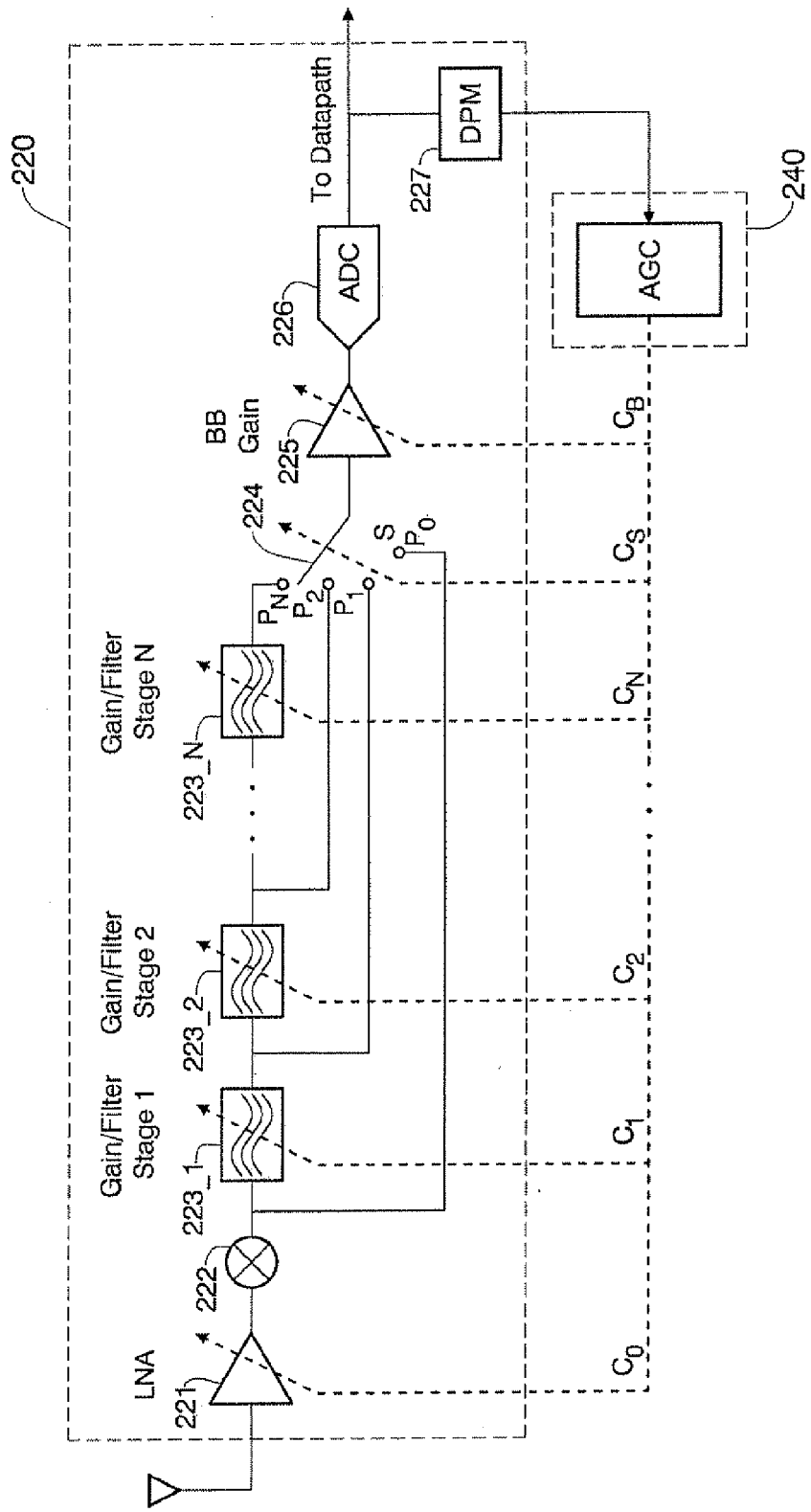
FIG. 2 shows an automatic gain control example according to the disclosure.

FIG. 2 shows a block diagram of an exemplary receiver front end module coupled to an exemplary controller module according to the disclosure. The receiver front end module 220 may include at least a switch 224, an analog-to-digital converter (ADC) 226, a digital power measurement (DPM) unit 227, and a plurality of processing stages. The plurality of processing stages can include a RF processing stage, including a low noise amplifier (LNA) 221 and a mixer 222, a plurality of gain/filter stages 223_1 to 223_N, and a baseband (BB) gain stage 225. These elements can be coupled together as shown in FIG. 2.

The plurality of processing stages can be designed to include controllable parameters, such as controllable gains. A controllable parameter can be adjusted in a limited range, for example to avoid amplifier nonlinearities. Together, the controllable parameters can be adjusted to achieve a property target, such as a signal power target.

More specifically, the LNA 221 can include any suitable circuitry, and can be configured to receive a RF signal from an antenna module, amplify the RF signal, and provide the amplified RF signal to a subsequent processing circuit. The LNA 221 can include a variable gain amplifier. The gain of the variable gain amplifier can be adjusted in accordance to a control signal, such as $C_0$ in FIG. 2.

The mixer 222 can include any suitable circuitry, and can be configured to receive the amplified RF signal, and may down-convert the amplified RF signal to a lower frequency, such as an intermediate frequency (IF), a base-band frequency, and the like. For example, the mixer 222 may be coupled to an oscillator, such as a local oscillator, to receive a periodic signal. The periodic signal can be mixed with the amplified RF signal to obtain a frequency reduced signal.

The plurality of gain/filter stages 223_1 to 223_N may include any suitable circuitry, such as amplifiers, filters, logic, and the like, that can further process the received signals to achieve the property target. For example, a gain/filter stage can be configured to include a variable gain amplifier. The gain of the variable gain amplifier can be adjusted in accordance to a control signal, such as $C_1$-$C_N$ shown in FIG. 2.

The base-band gain stage 225 can also include any suitable circuitry that can be configured to amplify a received signal. The base-band gain stage 225 can be configured to include a variable gain amplifier. The gain of the variable gain amplifier can be adjusted in accordance to a control signal, such as $C_B$ in FIG. 2.

The switch 224 can provide a switching mechanism for the DPM unit 227 to be coupled with the plurality of processing stages. Therefore, the DPM unit 227 can measure parameters of the plurality of processing stages. For example, the switch 224 may be coupled to the mixer 222 and the plurality of gain/filter stages 223_1 to 223_N as shown in FIG. 2. Additionally, the switch 224 can be configured to switch in accordance to a control signal, such as $C_S$ shown in FIG. 2. According to an aspect of the disclosure, the switch 224 may be implemented as an analog switch.

The ADC 226 can include any suitable circuitry that can convert an analog signal to a digital data stream. The ADC 226 may sample the analog signal at a pre-determined sampling rate, and convert the sampled signal to digital values to form the digital data stream. The digital data stream can be transmitted to a data path, and may be received by subsequent processing components, such as demodulator module, decoder module, and the like, to extract the information transmitted from the base station.

The DPM unit 227 may receive a digital signal, and measure a power level of the digital signal. Further, the measurements can be provided to the controller module 240 to adjust the controllable parameters accordingly. It is noted that other suitable measurement unit can also be used, such as a signal amplitude or peak measurement unit. Additionally, it is also noted that an analog measurement unit can be used with suitable adjustments, for example before the ADC 226.

The controller module 240 can include an automatic gain control (AGC) unit that can be configured to receive measurements from a measurement unit, and provide various control signals to a plurality of processing stages to adjust the respective controllable parameters. In the example, the controller module 240 can receive digital power measurements from the DPM unit 227, and can provide control signals $C_0$-$C_N$ and $C_B$ to the plurality of processing stages based on the received digital power measurements. Additionally, the controller module 240 may provide a control signal $C_S$ to the switch 224 that can enable the DPM unit 227 to be selectively coupled with different processing stages.

During operation, for example, the controller module 240 may vary the control signal $C_S$ to control the switch 224 to position $P_0$, therefore the DPM unit 227 can be coupled to the mixer 222 to measure a power level of the mixer 222 output. The power level can be provided to the AGC unit of the controller module 240. The AGC unit may determine the control signal $C_0$, which may vary the controllable gain of the LNA 221, for example to achieve a power target at the mixer 222.

Subsequently, the controller module 240 may vary the control signal $C_S$ to control the switch 224 to position $P_1$, therefore the DPM unit 227 can be coupled to the gain/filter stage 223-1 to measure a power level of the gain/filter stage 223-1 output. The power level can be provided to the AGC unit of the controller module 240. The AGC unit may determine the control signal $C_1$, which may vary the controllable gain of the gain/filter stage 223-1, for example to achieve a power target at the gain/filter stage 223-1.

So on and so forth, the controller module 240 may adjust the controllable gains of the plurality of processing stages based on the power measurements of the DPM unit 227, for example following a pre-determined sequence, such as a signal path. Therefore, a target property can be distributed among the plurality of processing stages with simple steps to improve system robustness. According to an embodiment of the disclosure, the base-band gain stage 225 may be initialized to unit gain, and can be kept at unit gain while adjusting other stages. After the other stages have been adjusted, the based band gain stage 225 can be adjusted to achieve the signal power target.

According to an aspect of the disclosure, using the switch 224 to couple the DPM unit 227 with the plurality of processing stages can reduce circuitry footprint. In addition, the DPM unit 227 can provide measurement of an increased resolution. Thus, the AGC unit may include a simplified algorithm to determine the controllable parameters, which may increase the robustness of a receiver.

It is noted that the AGC unit can be implemented in the form of application specific integrated circuit (ASIC) according to an aspect of the disclosure. Additionally, the AGC unit can be implemented in the form of software codes executed by a processor.

Figure 3:
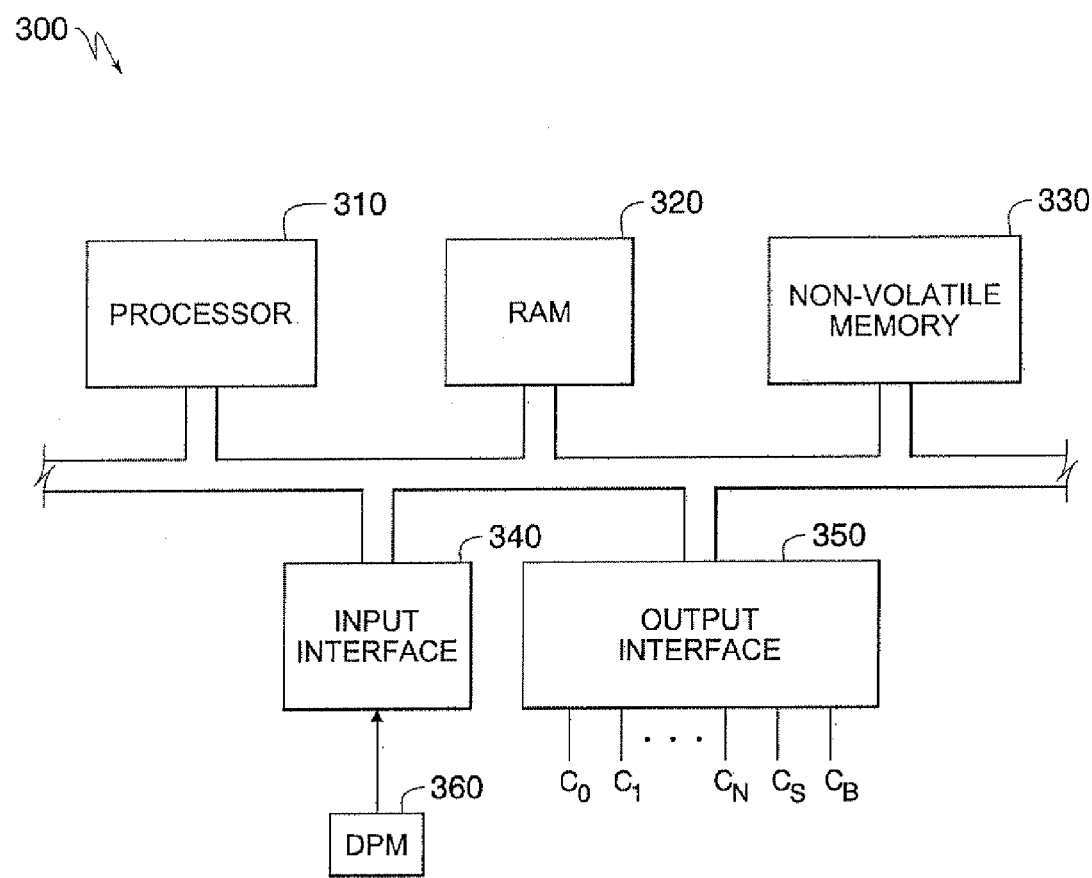
FIG. 3 shows a block diagram of an exemplary controller.

FIG. 3 shows a block diagram of an exemplary controller module. The controller module 300 may include a processor unit 310, such as a general processor, a random access memory (RAM) unit 320, a non-volatile memory 330, an input interface unit 340, and an output interface unit 350. These elements can be coupled together as shown in FIG. 3.

The processor unit 310 can execute system and application programs. The non-volatile memory 330 can hold information even when power is off. Therefore, the non-volatile memory 330 can be used to store system and application programs, such as firmware. The system and application programs may include an automatic gain control (AGC) algorithm. The RAM unit 320 is readable and writable. Generally, the RAM unit 320 can have a fast access speed. Data and codes of software programs may be stored in the RAM unit 320 during operation, such that the processor unit 310 can access the RAM unit 320 for the codes and data instead of the non-volatile memory 330.

The input interface unit 340 may be coupled with one or more detector unit, such as a DPM unit 360, to receive detected parameters, for example of a plurality of processing stages of a receiver front end module. The DPM unit 360 is similar to the DPM unit 227 as shown in FIG. 2. The output interface unit 350 may be coupled with the plurality of processing stages to provide control signals, such as $C_0$-$C_N$, and $C_B$ in FIG. 3. The control signals can be used to adjust controllable parameters of the plurality of processing stages to achieve a property target. Additionally, the output interface unit 350 may be coupled with a switching mechanism, such as the switch 224 in FIG. 2, to provide a control signal, such as $C_S$, to direct the switching mechanism. The switching mechanism may enable the DPM unit 360 to detect the plurality of processing stages.

During operation, for example, the processor unit 310 may execute system and application programs in the memory unit. The system and application codes may determine a time to start an AGC algorithm. The AGC algorithm may result in sending the control signal $C_S$. The control signal $C_S$ may enable a switching mechanism, such as the switch 224, to couple a first processing stage, such as the mixer 222 in FIG. 2, to the DPM unit 360. Therefore, the DPM unit 360 may provide a digital power measurement to the controller module 300 via the input interface unit 340. The digital power measurement can be received by the AGC algorithm executed by the processor unit 310. The AGC algorithm may adjust a controllable parameter of the first processing stage based on the digital power measurement. The controllable parameter of the first processing stage may enable the first processing stage to meet a property target. For example, the AGC algorithm may send the control signal $C_0$ to the LNA 221 in FIG. 2, via the output interface unit 350. The control signal $C_0$ may adjust the controllable gain of the LNA 221 to enable the output of the mixer 222 to meet a stage power target.

Subsequently, the AGC algorithm executed by the processor unit 310 may vary the control signal $C_S$ to couple a second processing stage, such as the gain/filter stage 223-1 in FIG. 2, to the DPM unit 360. Therefore, the DPM unit 360 may provide a digital power measurement of the second processing stage to the controller module 300 via the input interface unit 340. The AGC algorithm executed by the processor unit 310 may adjust a controllable parameter of the second processing stage. The controllable parameter of the second processing stage may enable the second processing stage to operate with the first processing stage to meet a property target at the second processing stage. For example, the AGC algorithm may send the control signal $C_1$ to the gain/filter stage 223-1 in FIG. 2, via the output interface unit 350. The control signal $C_1$ may adjust the controllable gain of the gain/filter stage 223-1 to enable the output of the gain/filter stage 223-1 to meet a stage power target.

So on and so forth, the AGC algorithm executed by the processor unit 310 may adjust the controllable parameters of the plurality of processing stages to achieve a target property. Thus, the target property can be distributed among the plurality of processing stages.

Figure 4:
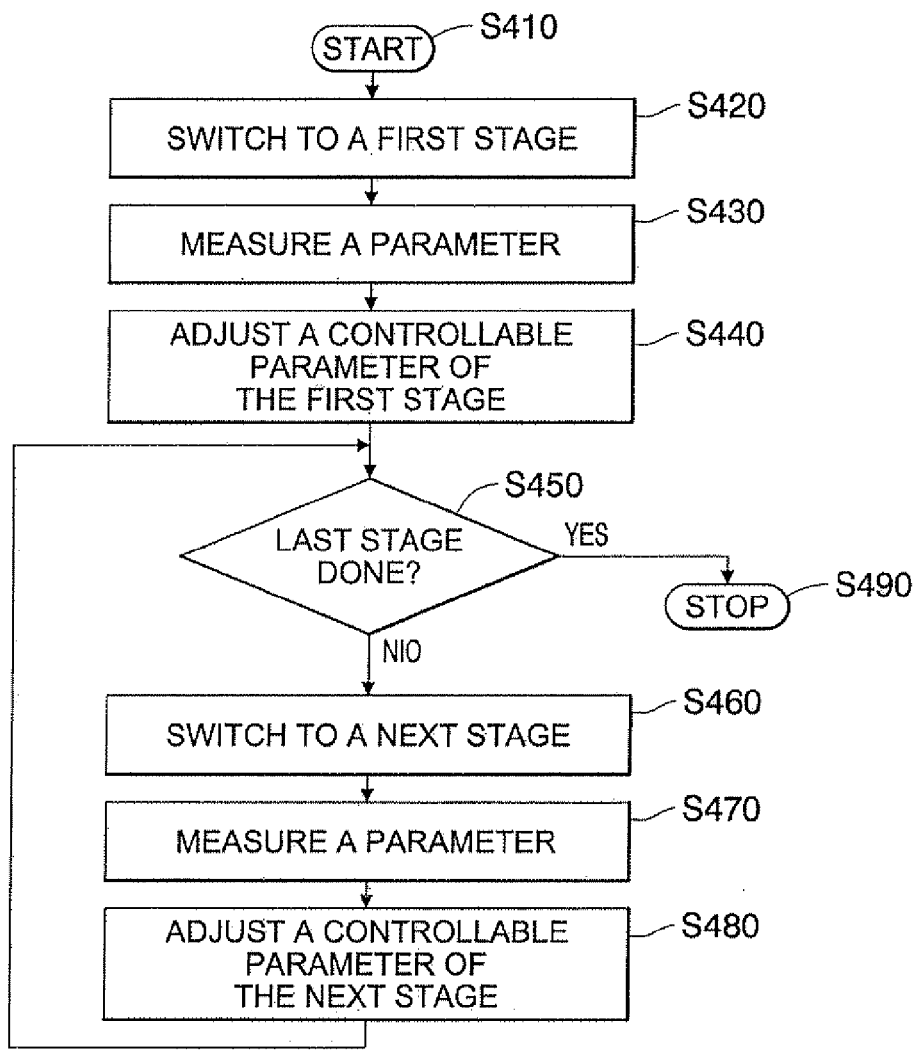
FIG. 4 shows a flowchart outlining an exemplary automatic gain control process.

FIG. 4 shows a flow chart outlining an automatic gain control process. The process starts at step S410, and proceeds to step S420.

In step S420, a switching mechanism, such as the switch 224 in FIG. 2, may enable a detector, such as the DPM unit 227 in FIG. 2, to be coupled with a first processing stage, such as the mixer 222 in FIG. 2. In the example of FIG. 2, the switch 224 may direct the output of the mixer 222 to the ADC 226. The ADC 226 may convert the output of the mixer 222 to a digital signal and provide the digital signal to the DPM unit 227. Then, the process can proceed to step S430.

In step S430, the detector may measure a parameter of the first processing stage. In the example of FIG. 2, the DPM unit 227 may measure a digital power level of the mixer 222 output. Then, the digital power level can be provided to the controller module 240. Then the process proceeds to step S440.

In step S440, a controller may receive the measured parameter and may adjust a controllable parameter of the first processing stage based on the measured parameter. In the example of FIG. 2, the controller module 240 may receive the digital power level measurement of the mixer 222 output, and may send the control signal $C_0$ to the LNA 221 to adjust the variable gain of the LNA 221. Thus, the mixer 222 output may meet a power target. Then the process can proceed to step S450.

In step S450, a judgment can be made as to whether the process has done with the last processing stage. If the process has done with the last processing stage, the process proceeds to step S490 and terminates. Otherwise, the process proceeds to step S460.

In step S460, the switching mechanism can be controlled to couple a next processing stage to the detector. In the example of FIG. 2, the controller module 240 may control the switch 224 via the control signal $C_S$ to couple the gain/filter stage 223-1 to the DPM unit 227. More specifically, the switch 224 may direct an output of the gain/filter stage 223-1 to the ADC 226. The ADC 226 may convert the output of the gain/filter stage 223-1 to a digital signal. The digital signal can be transmitted to the DPM unit 227. Then the process proceeds to step S470.

In step S470, the detector can measure a parameter for the next processing stage. In the example of FIG. 2, the DPM unit 227 may measure a digital power level of the gain/filter stage 223-1 output. Further, the digital power level can be provided to the controller module 240. Then the process proceeds to step S480.

In step S480, the controller may receive the measured parameter and may adjust a controllable parameter of the next processing stage based on the measured parameter. In the example of FIG. 2, the controller module 240 may receive the digital power level measurement of the gain/filter stage 223-1 output, and may send the control signal $C_1$ to the gain/filter stage 223-1 to adjust the variable gain of the gain/filter stage 223-1. Thus, the gain/filter stage 223-1 output may meet a power target. Then the process can proceed to step S450.

The steps S450 to S480 can be repeated. Thus, the controller can control the switching mechanism to selectively couple the plurality of processing stages to the detector, respectively. The detector may detect parameters of the plurality of processing stages. Then, the controller may adjust controllable parameters of the plurality of processing stages based on the detected parameters. In an example, the controller may control the switching mechanism to follow a pre-determined sequence, such as a signal path, to couple the plurality of processing stages to the detector. Thus, the controllable parameters of plurality of processing stages can be adjusted following the pre-determined sequence.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A receiver, comprising:
   a low noise amplifier configured to amplify a signal received from an antenna;
   a mixer coupling between the low noise amplifier and a plurality of processing stages, each processing stage including at least an amplifier and a filter;
   at least a first processing stage and a second processing stage of the plurality of processing stages, each of at least the first processing stage and the second processing stage including a controllable parameter;
   a switch configured to switchably couple the processing stages to a detector module;
   the detector module having a variable gain configured to adjust the variable gain according to a control signal received from a controller module and switchably detect an output parameter of each of the first processing stage and the second processing stage from the switch, the detector module being coupled between the switch and the controller module; and
   the controller module configured to control the controllable parameters of at least the first processing stage and the second processing stage based on the detected output parameters of at least the first processing stage and the second processing stage.

2. The receiver according to claim 1, further comprising:
   an analog-to-digital converter (ADC) unit configured to switchably convert an output signal of each of at least the first processing stage and the second processing stage to a digital signal for the detector module to detect the output parameter, wherein the detector module is configured to use the digital signal to detect the output parameter for the at least first processing stage and second processing stage.

3. The receiver according to claim 2, wherein the detector module comprises a digital power measurement unit.

4. The receiver according to claim 1, wherein the switch is configured to couple at least the first processing stage and the second processing stage to the detector module.

5. The receiver according to claim 4, wherein the switch is an analog switch.

6. The receiver according to claim 1, wherein at least the first processing stage and the second processing stage comprise a variable gain amplifier having a controllable gain, respectively.

7. The receiver according to claim 1, wherein the first processing stage and the second processing stage are coupled sequentially to process a signal.

8. The receiver according to claim 7, wherein the detector module is further configured to be switchably coupled to at least the first processing stage and the second processing stage following a pre-determined sequence.

9. The receiver according to claim 1, wherein the receiver is operative in an orthogonal frequency division multiplexing (OFDM) system.

10. The receiver according to claim 9, wherein the OFDM system is a mobile wireless system.

11. The receiver according to claim 9, wherein the OFDM system is a fixed OFDM wireless system.

12. The receiver according to claim 9, wherein the detector module and the controller module are operative during a cyclic prefix of an OFDM symbol in a steady state operation.

13. The receiver according to claim 9, wherein the detector module and the controller module are operative when a signal power change is larger than a threshold.

14. A method for automatic gain control, comprising:
    amplifying a signal received from an antenna by a low noise amplifier;
    down-converting the amplified signal to a lower frequency by a mixer coupling between the low noise amplifier and a plurality of processing stages, each processing stage including at least an amplifier and a filter;
    switchably coupling via a switch the processing stages to a detector having a variable gain;
    adjusting the variable gain according to a control signal received by the detector from a controller;
    detecting by the detector an output parameter of a first processing stage of the plurality of processing stages having a controllable parameter from the switch;
    adjusting the controllable parameter of the first processing stage based on the detected output parameter of the first processing stage;
    switching a second processing stage of the plurality of processing stages having a controllable parameter to the detector;
    detecting an output parameter of the second processing stage using the detector; and
    adjusting the controllable parameter of the second processing stage based on the detected output parameter of the second processing stage.

15. The method according to claim 14, wherein detecting the output parameter of the first processing stage further comprises:
    converting an output signal of the first processing stage to a digital signal; and
    detecting the output parameter based on the digital signal.

16. The method according to claim 15, wherein detecting the output parameter based on the digital signal further comprises:
    measuring a digital power level based on the digital signal.

17. The method according to claim 14, wherein switching the second processing stage further comprises:
    controlling a switch to couple the second processing stage to the detector.

18. The method according to claim 17, wherein the switch is an analog switch.

19. The method according to claim 14, wherein the controllable parameter of the first processing stage comprises a controllable gain of a variable gain amplifier.

20. The method according to claim 14, wherein switching the second processing stage further comprises:
    switching the second processing stage to the detector according to a pre-determined sequence.

21. The method according to claim 14, further comprising:
    receiving information of a cyclic prefix duration of an orthogonal frequency division multiplexing (OFDM) symbol in a steady state operation.

22. The method according to claim 14, further comprising:
    detecting a signal power change larger than a threshold during receipt of start frames of a network entry.

* * * * *